United States Patent
LoRegio et al.

(12) 
(10) Patent No.: US 6,647,175 B1
(45) Date of Patent: Nov. 11, 2003

(54) REFLECTIVE LIGHT MULTIPLEXING DEVICE

(75) Inventors: Paul LoRegio, Penetang (CA); Tony Light, Midland (CA)

(73) Assignee: Raytheon Company, Lexington, MA (US)

( * ) Notice: Subject to any disclaimer, the term of this patent is extended or adjusted under 35 U.S.C. 154(b) by 186 days.

(21) Appl. No.: 09/973,102

(22) Filed: Oct. 8, 2001

(51) Int. Cl.[7] .................................................. G02B 6/28
(52) U.S. Cl. ........................................................ 385/24
(58) Field of Search ............................... 385/24, 12, 37, 385/147; 372/32, 96; 398/42, 43, 182, 202, 134, 115, 124, 116

(56) References Cited

U.S. PATENT DOCUMENTS

| 4,244,045 A | | 1/1981 | Nosu et al. |
|---|---|---|---|
| 4,904,043 A | | 2/1990 | Schweizer |
| 4,998,256 A | * | 3/1991 | Ohshima et al. ............... 372/32 |
| 5,583,683 A | | 12/1996 | Scobey |
| 5,889,904 A | | 3/1999 | Pan et al. |
| 5,920,411 A | * | 7/1999 | Duck et al. .................... 398/85 |
| 5,946,435 A | | 8/1999 | Zheng et al. |
| 6,160,931 A | * | 12/2000 | Asakura ....................... 385/24 |

* cited by examiner

*Primary Examiner*—Akm Enayet Ullah
(74) *Attorney, Agent, or Firm*—William C. Schubert; Glenn H. Lenzen, Jr.

(57) ABSTRACT

An optical multiplexing device has at least one light-extraction module intercepting a light beam. Each light-extraction module includes a light band-reflect filter that receives the light beam, reflects a reflected beam of an extracted light wavelength band, and transmits the light beam except for the extracted light wavelength band. A light receiver receives the reflected beam from the light band-reflect filter. A number of the light-extraction modules, each having a light band-reflect filter operable with a different wavelength, serially process the light beam to extract each desired wavelength.

16 Claims, 5 Drawing Sheets

REFLECTIVE LIGHT MULTIPLEXING DEVICE

This invention relates to optical communications and, more particularly, to an optical multiplexing device used in an optical communications system.

BACKGROUND OF THE INVENTION

In an optical communications system, information is encoded onto a light signal. The light signal is transmitted from one point to another, as for example by free-space light beams or optical fibers. At the receiving end, the information is read from the light signal.

An important advantage of optical communications is that a number of different light signals of different wavelengths may be mixed together (multiplexed) into a single light beam in a technique known as wavelength division multiplexing (WDM). Each light signal of a different wavelength, or channel, has information encoded onto it prior to the mixing of the channels. At the receiving end, the channels are separated, or demultiplexed, according to their wavelengths. The information on each channel is read from the demultiplexed light of that wavelength. A single multiplexed light beam may therefore carry many times the information that may be transmitted by a non-multiplexed light beam.

The multiplexing and/or demultiplexing may be accomplished using a series of light bandpass filters. Each filter is formed as a substrate and a multilayer dielectric light-transmissive optical stack deposited upon the substrate. The bandpass filter transmits only light of a specific wavelength. When a multichannel beam is incident upon the filter, the light channel associated with the bandpass range is transmitted through the filter to a light receiver behind the filter. The beam with the remaining channels is reflected to another filter, where the next channel is extracted from the beam in a similar fashion, and so on until all of the channels of information carried by the light beam have been separated for further processing.

As the number of channels transmitted on a light beam increases, the number of multiplexing or demultiplexing bandpass filters increases. The light beam that reaches each multiplexing or demultiplexing bandpass filter is reflected from the prior bandpass filter, so that any energy losses from the light beam due to angular misorientation or tolerances in the bandpass filters are multiplicative. For example, if there is a 2 percent loss of beam energy due to angular misorientation at each bandpass filter, the light energy of each channel reaching the next bandpass filter is 98 percent of the energy reaching the prior filter. If there are a large number of wavelength channels and corresponding bandpass filters, the reduction in light energy is significant. Additionally, existing multiplexers and demultiplexers of this type occupy a large area due to the reflective angular relationships.

An approach is needed to gain the advantages of the multiplexing and/or demultiplexing approach using filters, while avoiding the losses that are associated with the present approach. The present invention fulfills this need, and further provides related advantages.

SUMMARY OF THE INVENTION

The present invention provides an apparatus and method for the multiplexing and demultiplexing of light signals of different wavelengths transmitted in a common light beam. The present approach avoids multiplicative angular errors in a series of light-extraction modules. The angle of incidence of the light beam to each of the filters may be adjusted without concern for adversely affecting the downstream performance. The present approach also permits the plan-view footprint of the multiplexing device to be more generally linear rather than more generally rectangular.

In accordance with the invention, an optical multiplexing device comprises a first light band-reflect filter that receives an incident beam, reflects a first reflected beam of a first light wavelength band and transmits a first transmitted beam comprising light wavelengths other than the first light wavelength band, and a first receiver that receives the first reflected beam from the first light band-reflect filter. There is additionally a second light band-reflect filter that receives the first transmitted beam from the first light band-reflect filter, reflects a second reflected beam of a second light wavelength band and transmits a second transmitted beam comprising light wavelengths other than the second light wavelength band, and a second receiver that receives the second reflected light wavelength band from the second light band-reflect filter. There may be a light transmitter of the incident beam.

The present approach uses band-reflect filters that reflect the wavelength that is being extracted at each filter, rather than bandpass filters as in conventional optical multiplexing devices. The remainder of the beam is transmitted straight through the filter, so that the angle of the filter to the beam does not affect the transmitted beam. Instead, the angle of the filter to the beam is selected to achieve optimal discrimination of the wavelength that is being extracted by that filter, because the wavelength that is reflected is usually dependent upon the angle of incidence of the light beam to the filter. The first light band-reflect filter and the second light band-reflect filter may be of different constructions, with each filter construction optimized for the wavelength of light being reflected. They may instead be of same construction, and the wavelength selectivity is achieved by making the first angle of incidence of the incident beam upon the first light band-reflect filter different from the second angle of incidence of the first transmitted beam upon the second light band-reflect filter.

The optical multiplexing device may include a first alternate receiver, and a first switch mirror that controllably directs the first reflected beam to the first alternate receiver instead of the first receiver. The optical multiplexing device may further includes a second alternate receiver, and a second switch mirror that controllably directs the second reflected beam to the second alternate receiver instead of the second receiver.

The first light band-reflect filter may be structured to reflect the first reflected beam of the first light wavelength band, and transmits light of all other wavelengths. The second light band-reflect filter may be structured to reflect the second reflected beam of the second light wavelength band, and transmit light of all other wavelengths.

The first light band-reflect filter may instead be an edge filter. In a first embodiment, the first light band-reflect filter comprises a first high-pass edge filter having a first high-pass edge wavelength at an upper end of the first light wavelength band, and the second light band-reflect filter comprises a second high-pass edge filter having a second high-pass edge wavelength at an upper end of the second light wavelength band. In this first embodiment the second light wavelength band is at a higher wavelength than the first light wavelength band, and the light wavelength bands are extracted sequentially from lowest wavelength to highest wavelength. In a second embodiment, the first light band-reflect filter comprises a first low-pass edge filter having a first low-pass edge wavelength at a lower end of the first light wavelength band, and the second light band-reflect filter comprises a second low-pass edge filter having a second low-pass edge wavelength at a lower end of the second light wavelength band. In this second embodiment, the second light wavelength band is at a lower wavelength than the first light wavelength band, and the light wavelength bands are extracted sequentially from highest wavelength to lowest wavelength.

The optical multiplexing device is preferably used as a demultiplexer, but it may be used instead as a multiplexer based upon the reciprocal nature of the beam paths and functionality of the components. In that case, the first receiver and the second receiver are the same common receiver, and the second light band-reflect filter combines the second reflected beam and the second transmitted beam to form a mixed beam that is received by the common receiver.

Stated alternative, an optical multiplexing device comprises at least one light-extraction module intercepting a light beam. Each light-extraction module comprises a light band-reflect filter that receives the light beam, reflects a reflected beam of an extracted light wavelength band, and transmits the light beam except for the extracted light wavelength band, and a receiver that receives the reflected beam from the light band-reflect filter. There are preferably at least two of the light extraction modules, and preferably a plurality of the light extraction modules, with each light-extraction module having a different extracted light wavelength band. This approach may utilize the various features and embodiment discussed above.

By substituting band-reflect filters for bandpass filters, the present approach avoids multiplicative angular errors and allows the filters to be angle-tuned as necessary for optimal reflection and extraction of a selected wavelength of light. The multiplexing device may be made with a more-linear configuration that saves space in some applications.

The apparatus is more robust in conditions of vibration, stress, thermal excursions, and the like than are conventional multiplexing devices, because it is less sensitive to angular changes in the filter orientations. Thus, for example, if one of the extraction filters becomes misoriented due to vibration or the like, in the present approach only the information on the wavelength or channel being extracted at that extraction filter will be lost. The transmitted beam with the other wavelengths will be unaffected. In a conventional demultiplexer, if one of the filters becomes angularly misoriented by too large an amount, it will be impossible to extract any information from the subsequent beam that contains the other wavelengths.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
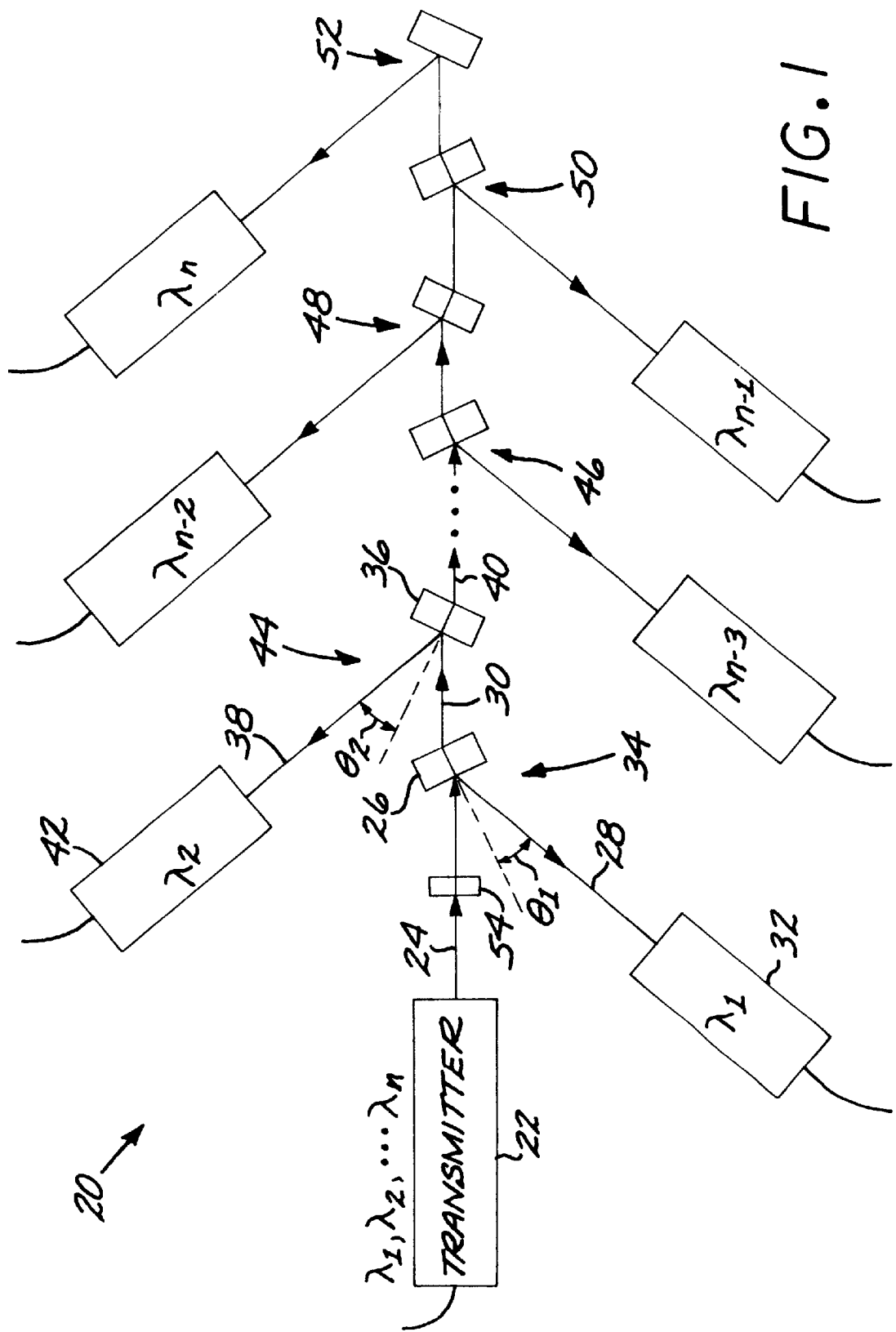
FIG. 1 is a schematic plan view of a first embodiment of the apparatus of the invention.
Figure 2:
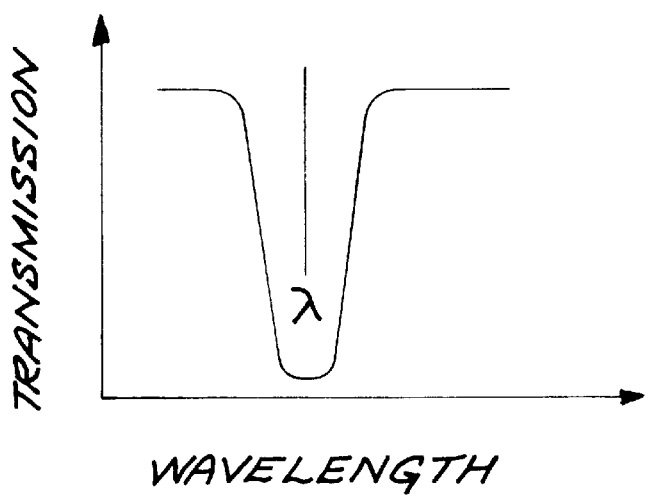
FIG. 2 is a graph of transmission as a function of wavelength for a band-reflect filter that passes all wavelengths other than the reflected wavelength band.

FIG. 1 illustrates an optical multiplexing device 20 having a transmitter 22 that transmits a light beam 24 having light wavelength bands $\lambda_1, \lambda_2, \lambda_3, \ldots \lambda_n$ mixed therein. Each of the wavelengths may be viewed as a data channel. The light beam 24 is incident upon a first light band-reflect filter 26 at an angle $\theta_1$ (relative to a line perpendicular to the surface of the first light bnad-reflect filter 26). (The values of $\theta$ are exaggerated for illustration, but in practice are often only a few degrees in order to minimize insertion losses.) The first light band-reflect filter 26 reflects a first reflected beam 28 of a first light wavelength band $\lambda_1$, and transmits a first transmitted beam 30 comprising light wavelengths $\lambda_2, \lambda_3, \ldots \lambda_n$, other than the first light wavelength band $\lambda_1$. FIG. 2 illustrates the reflective properties of one type of operable filter 26, which for the angle of incidence $\theta_1$ reflects light in the wavelength band $\lambda$ and transmits lower and higher wavelengths of light. A first receiver 32 receives the first reflected beam 28 from the first light band-reflect filter 26. The first light band-reflect filter 26 and the first receiver 32 may be considered as a first extraction module 34 for the first light wavelength band $\lambda_1$.

A second light band-reflect filter 36 receives the first transmitted beam 30 from the first light band-reflect filter 26 at an angle of incidence $\theta_2$, reflects a second reflected beam 38 of a second light wavelength band $\lambda_2$, and transmits a second transmitted beam 40 comprising light wavelengths $\lambda_3, \ldots \lambda_n$ other than the second light wavelength band $\lambda_2$ (and the previously extracted first light wavelength band $\lambda_1$). The second light band-reflect filter 36 may be of a different construction than the first light band-reflect filter 26 so that it reflects a different light wavelength at the same angle of incidence (so that $\theta_2=\theta_1$). The second light band-reflect filter 36 may instead be of the same construction as the first light band-reflect filter 26 but angled differently to its incident beam (so that $\theta_2$ and $\theta_1$ are not the same) so that it reflects a different light wavelength at the different angle of incidence. A second receiver 42 receives the second reflected beam 38 from the second light band-reflect filter 36. The second light band-reflect filter 36 and the second receiver 42 may be considered as a second extraction module 44 for the second light wavelength band $\lambda_2$.

This same approach may be extended by adding further light extraction modules, here indicated as extraction modules 46, 48, 50, and 52, to extract additional mixed components of the light beam 24. Each of these extraction modules 46, 48, 50, and 52 is structured like the light extraction modules 34 and 44, and the prior discussion is incorporated as to these other extraction modules.

An important feature of the present approach is that the first transmitted beam 30, the second transmitted beam 40, and all subsequent transmitted beams of other extraction modules are parallel to, and nearly collinear with, the incident light beam 24. This relation has three further important consequences. First, the multiplexing device 20 may be made relatively "linear" in design, so that it has a plan-view footprint that is long but not wide. There are no long free-space beampaths that increase the space occupied by the multiplexing device 20. This configuration is useful in some specific types of optical systems. Second, because the transmitted beams are not reflected from their respective filters, they are not sensitive to the angle at which the filter is oriented. The angles of incidence $\theta_1$ and $\theta_2$ to the respective light band-reflect filters 26 and 36 may be altered as necessary to achieve good reflection of the respective wavelengths $\lambda_1$ and $\lambda_2$. This altering of the angles of incidence is accomplished by rotating the light band-reflect filters 26 and 36 about an axis extending out of the plane of the page in the illustration of FIG. 1. Third, if one of the band-reflect filters becomes too greatly angularly misoriented due to vibration or the like, only the data in its reflected beam will be lost. For example, if the first light band-reflect filter 26 were to become angularly misoriented so that the first reflected beam 28 never reaches the first receiver 32, the information carried on the first reflected beam 28 is lost. However, all of the information carried on the channels in the first transmitted beam 30 remains available for downstream extraction.

FIG. 2 illustrates one approach to the reflective properties the light band-reflect filters 26 and 36 and subsequent light band-reflect filters. The filter of FIG. 2 reflects light in wavelength band $\lambda$ and transmits lower and higher wavelengths of light. It is used to extract the wavelength $\lambda$ from a broad wavelength beam of light.

Figure 3:
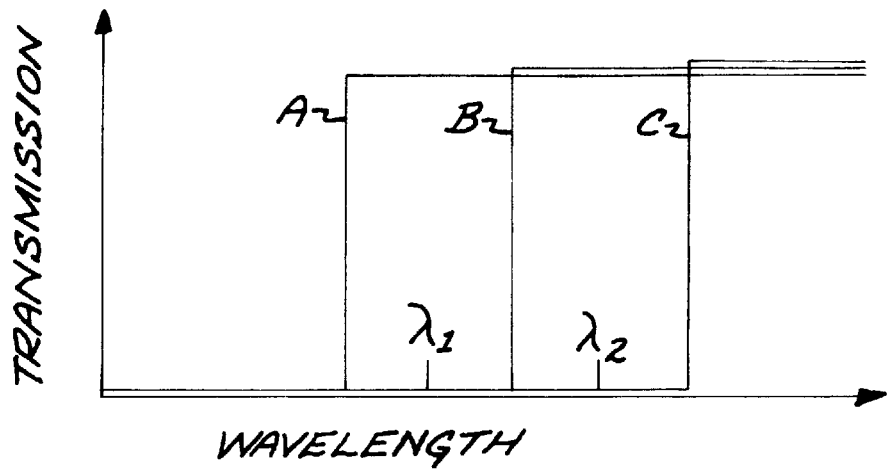
FIG. 3 is a graph of transmission as a function of wavelength for a series of high-pass band-reflect filters.
Figure 4:
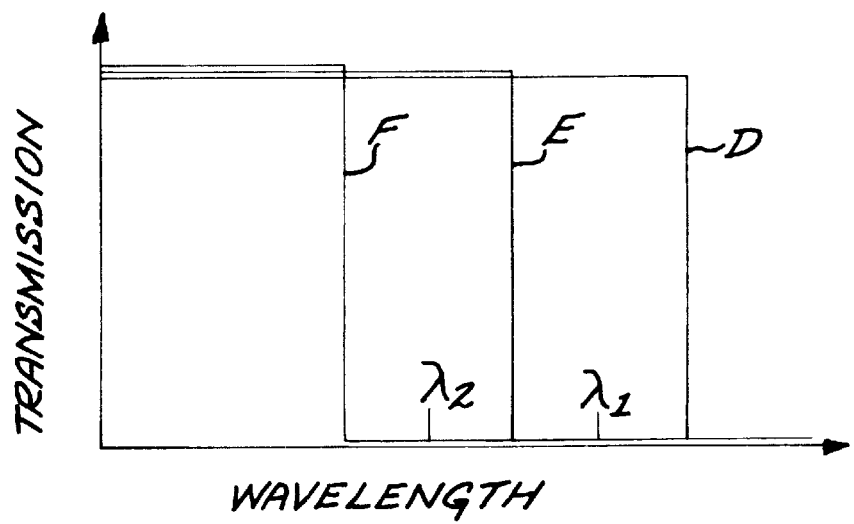
FIG. 4 is a graph of transmission as a function of wavelength for a series of low-pass band-reflect filters.

FIGS. 3 and 4 illustrate another approach to the design of the light band-reflect filters such as the filters 26 and 36. These filters are edge filters, either high-pass filters whose performance is illustrated in FIG. 3 or low-pass filters whose performance is illustrated in FIG. 4. The high-pass filters of FIG. 3 permit light of a wavelength greater than the edge wavelength to pass, and the low-pass filters of FIG. 4 permit light of a wavelength less than the edge wavelength to pass. It will be appreciated that the depictions of FIGS. 3–4 are idealizations, and that the "edges" have some spread in wavelength. Filters such as those of FIGS. 2–4 are of a multilayer thin-film construction, such as those described in U.S. Pat. Nos. 4,244,045 and 5,583,683, whose disclosures are incorporated by reference.

The high-pass filters of FIG. 3 are used in the apparatus of FIG. 1 as follows. An initial filter 54 with properties denoted by curve A may optionally be placed between the transmitter 22 and the first light band-reflect filter 26 to remove stray low-wavelength light from the light beam 24. If it is certain that there is no such stray low-wavelength light, the initial filter 54 may be omitted. The first light band-reflect filter 26 has the properties of curve B, with the filter edge just above $\lambda_1$, and in particular between $\lambda_1$ and $\lambda_2$. The light of wavelength band $\lambda_1$ is reflected as the first reflected beam 28, and the higher wavelengths of light are transmitted as the transmitted beam 30. The second light band reflective filter 36 has the properties of curve C, so that the light of wavelength band $\lambda_2$ is reflected as the second reflected beam 38. The process is repeated with the subsequent filters, so that the wavelength bands from the lowest to the highest wavelengths are successively extracted from the light beam using the apparatus of FIG. 1.

The low pass filters of FIG. 4 are used in a similar manner, but to successively extract the wavelength bands from the highest to the lowest wavelengths. The initial filter 54 has the properties of curve D, to remove any stray high-wavelength light from the light beam 24. The first light band-reflect filter 26 has the properties of curve E, so that the first reflected beam 28 extracts the highest remaining wavelength $\lambda_1$ of the light beam 24. The second light band-reflect filter 36 has the properties of curve F, so that the second reflected beam 38 extracts the next-highest remaining wavelength $\lambda_2$ of the light beam 24. The process is repeated with the subsequent filters, so that the wavelength bands from the highest to the lowest wavelengths are successively extracted from the light beam using the apparatus of FIG. 1.

Figure 5:
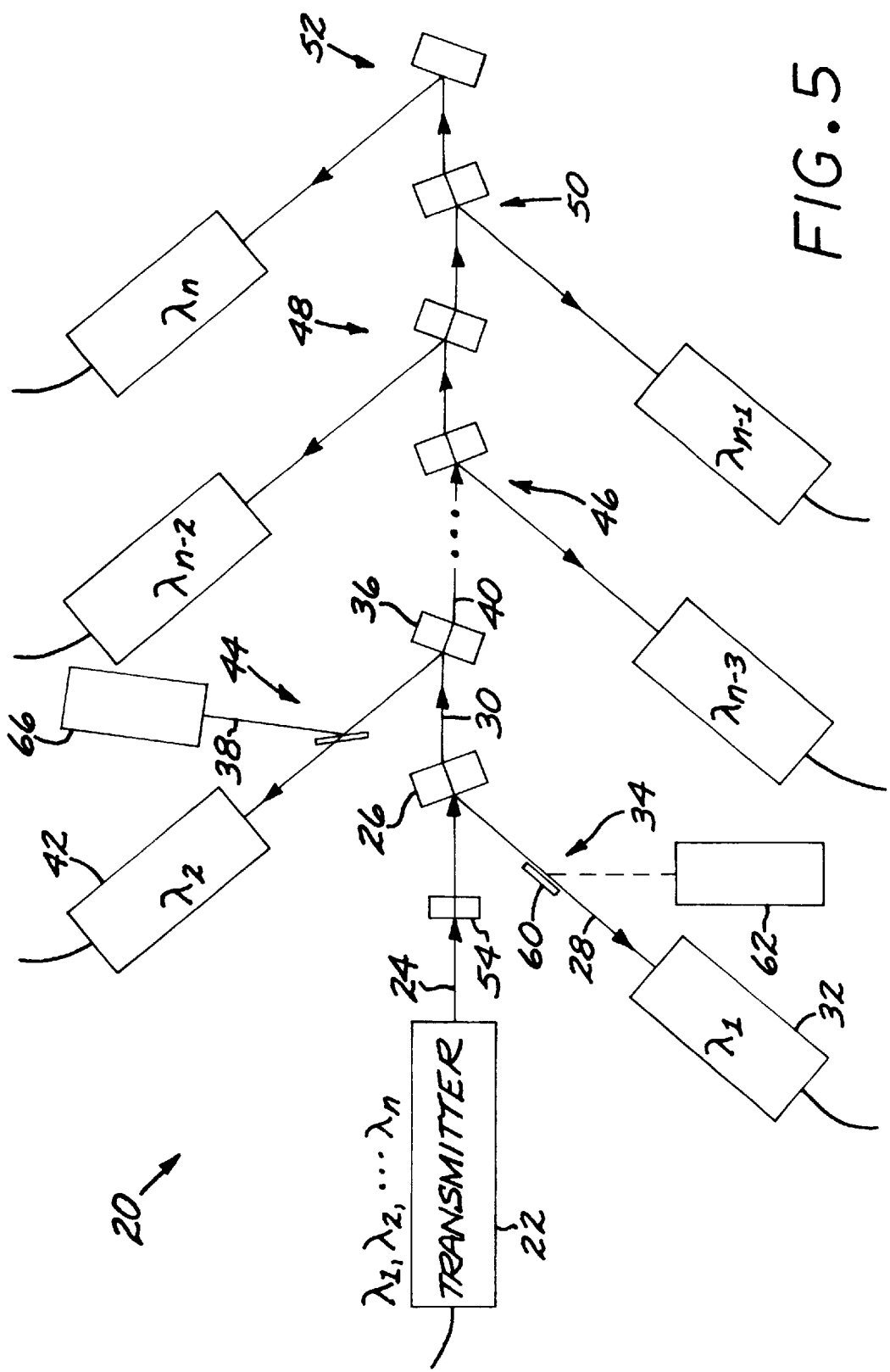
FIG. 5 is a schematic plan view of a second embodiment of the apparatus of the invention.

FIG. 5 illustrates another embodiment of the invention. This embodiment is similar in most respects to that of FIG. 1, and the same reference numerals are used in FIG. 5. The prior description of the embodiment of FIG. 1 is incorporated here as appropriate. The embodiment of FIG. 5 allows the reflected beams to be redirected to other light receivers.

In the embodiment of FIG. 5, switch mirrors are used to redirect the reflected beams as desired. A first switch mirror 60 is positioned adjacent to the first reflected beam 28. In the illustrated undeployed orientation, the first switch mirror 60 allows the first reflected beam 28 to pass to the first receiver 32. If the first switch mirror 60 were deployed to intercept the first reflected beam 28, it would re-direct the first reflected beam 28 to a first alternate receiver 62. Similarly, a second switch mirror 64 is positioned adjacent to the second reflected beam 38. In the illustrated deployed position, the second switch mirror 64 intercepts the second reflected beam 38 and redirects it to a second alternate receiver 66. If the second switch mirror 64 were retracted to an undeployed position that does not intercept the second reflected beam 38, the second reflected beam would pass to the second receiver 42.

Figure 6:
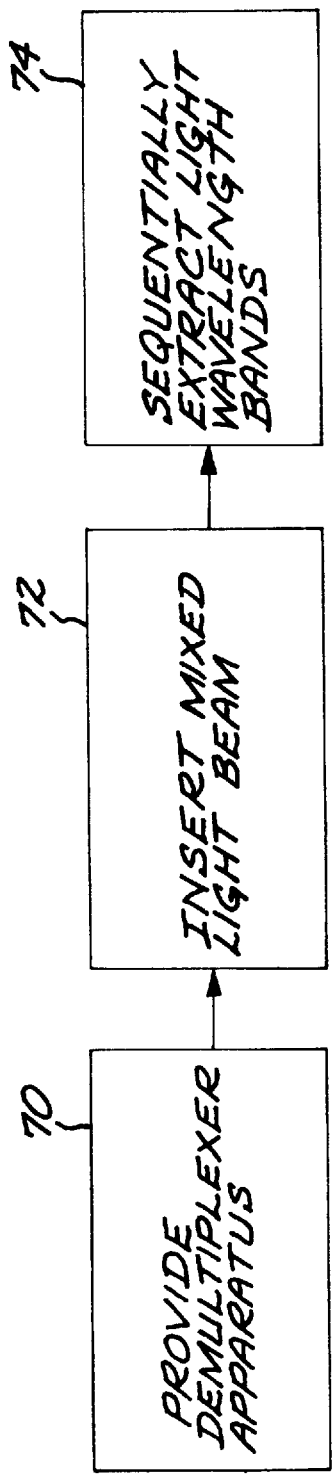
FIG. 6 is a block diagram of a first approach for practicing the invention.

FIG. 6 illustrates a preferred method for practicing the invention for demultiplexing. The multiplexing device apparatus 20, such as illustrated in FIG. 1 or 5, is provided for use as a demultiplexer, numeral 70. The light beam 24 having the wavelength bands $\lambda_1, \lambda_2, \lambda_3, \ldots \lambda_n$ mixed into the light beam 24 is inserted by the transmitter 22, numeral 72. The wavelength bands or channels are successively extracted from the light beam 24 in the manner discussed earlier.

Figure 7:
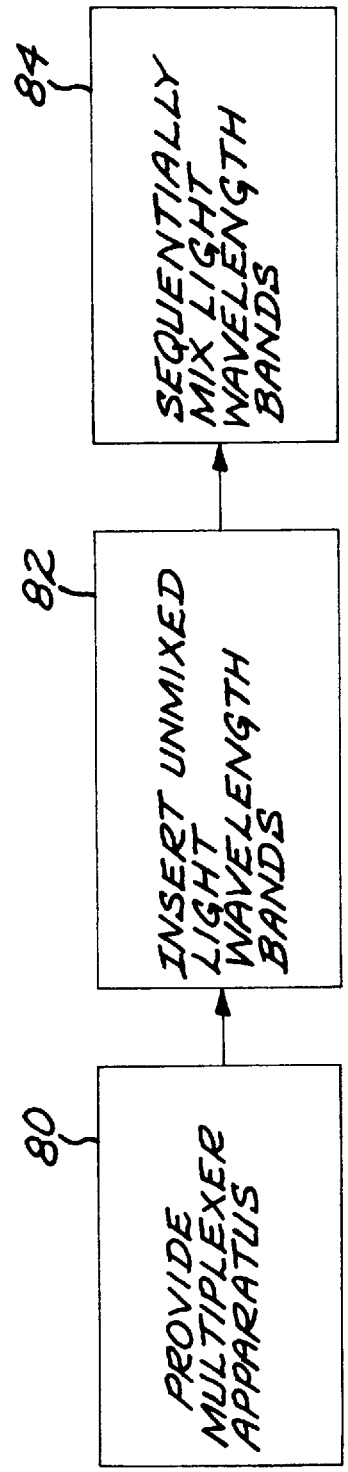
FIG. 7 is a block diagram of a second approach for practicing the invention.

The apparatus such as that of FIG. 1 or 5 is operable in a reciprocal fashion as a multiplexer. The same apparatus of FIGS. 1 and 5 may be used for a multiplexing function by replacing all of the receivers with transmitters of the same respective wavelengths and replacing the transmitter with a receiver. Thus, referring to FIG. 7, the multiplexing device apparatus 20 is provided, but with the changes just described. Unmixed light beams of individual wavelengths $\lambda_1, \lambda_2, \lambda_3, \ldots \lambda_n$ are inserted at the respective filters, numeral 82, and sequentially mixed together, numeral 84, to form a mixed beam that is output from right to left in FIGS. 1 or 5.

Figure 8:
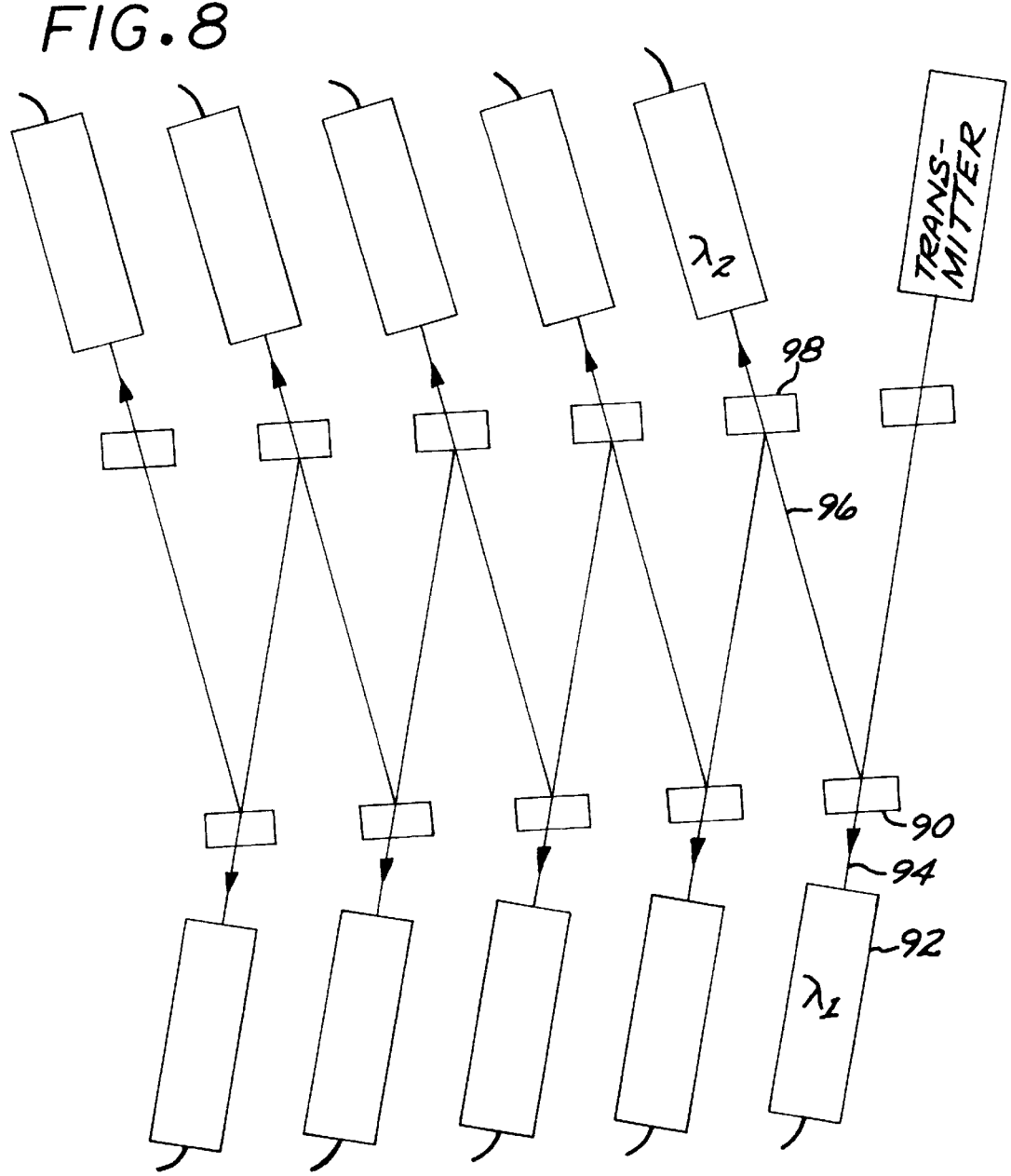
FIG. 8 is a schematic plan view of an approach for multiplexing/demultiplexing based on a bandpass filter.
Figure 9:
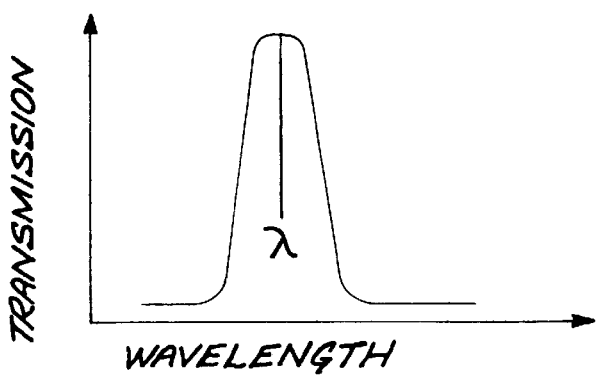
FIG. 9 is a graph of transmission as a function of wavelength for a bandpass filter that passes the transmitted wavelength and reflects all other wavelengths.

The present approach is contrasted with an approach shown in FIG. 8 using bandpass filters with properties shown in FIG. 9. In this bandpass filter, the transmitted beam includes the wavelength of interest that is to be extracted at that location, and the reflected beam includes all other wavelengths. Specifically, a first extraction bandpass filter 90 transmits light of wavelength $\lambda_1$ as a first transmitted beam 94 to a first receiver 92, and reflects other wavelengths as a first reflected beam 96 to a second extraction bandpass filter 98. The angular orientation of the first extraction bandpass filter 90 must be set exactly correctly, or some of the light in the first reflected beam 96 may not reach the correct location on the second extraction bandpass filter 98. At the second extraction bandpass filter 98, this process is repeated, except that the light of wavelength $\lambda_2$ is extracted. If the angular position of the second extraction bandpass filter 98 is also slightly inaccurate, the reflected beam from the second extraction bandpass filter 98 will be attenuated as a result of the angular errors in both of the extraction bandpass filters 90 and 98. The error and attenuation multiplicatively increase with increasing numbers of the extraction bandpass filters. Further, if the first extraction bandpass filter 90 were to become angularly misoriented so that the first reflected beam 96 does not reach the proper location on the second extraction bandpass filter 98, then the information on all of the data channels other than the $\lambda_1$ channel cannot be accessed. The present approach overcomes these problems in the manner discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical multiplexing device comprising:

a first light band-reflect filter that receives an incident beam, reflects a first reflected beam of a first light wavelength band, and transmits a first transmitted beam comprising light wavelengths other than the first light wavelength band;

a first receiver that receives the first reflected beam from the first light band-reflect filter;

a second light band-reflect filter that receives the first transmitted beam from the first light band-reflect filter, reflects a second reflected beam of a second light wavelength band, and transmits a second transmitted beam comprising light wavelengths other than the second light wavelength band; and a second receiver that receives the second reflected light wavelength band from the second light band-reflect filter.

2. The optical multiplexing device of claim 1, wherein the first light band-reflect filter and the second light band-reflect filter are of different constructions.

3. The optical multiplexing device of claim 1, wherein the first light band-reflect filter and the second light band-reflect filter are of same construction, and wherein a first angle of incidence of the incident beam upon the first light band-reflect filter is different from a second angle of incidence of the first transmitted beam upon the second light band-reflect filter.

4. The optical multiplexing device of claim 1, further including a transmitter of the incident beam that directs the incident beam upon the first light band-reflect filter.

5. The optical multiplexing device of claim 1, further including a first alternate receiver, and a first switch mirror that controllably directs the first reflected beam to the first alternate receiver instead of the first receiver.

6. The optical multiplexing device of claim 1, further including a second alternate receiver, and a second switch mirror that controllably directs the second reflected beam to the second alternate receiver instead of the second receiver.

7. The optical multiplexing device of claim 1, wherein the first light band-reflect filter reflects the first reflected beam of the first light wavelength band, and transmits light of all other wavelengths.

8. The optical multiplexing device of claim 1, wherein the first light band-reflect filter is an edge filter.

9. The optical multiplexing device of claim 1, wherein the first light band-reflect filter comprises a first high-pass edge filter having a first high-pass edge wavelength at an upper end of the first light wavelength band, and the second light band-reflect filter comprises a second high-pass edge filter having a second high-pass edge wavelength at an upper end of the second light wavelength band, and wherein the second light wavelength band is at a higher wavelength than the first light wavelength band.

10. The optical multiplexing device of claim 1, wherein the first light band-reflect filter comprises a first low-pass edge filter having a first low-pass edge wavelength at a lower end of the first light wavelength band, and the second light band-reflect filter comprises a second low-pass edge filter having a second low-pass edge wavelength at a lower end of the second light wavelength band, and wherein the second light wavelength band is at a lower wavelength than the first light wavelength band.

11. The optical multiplexing device of claim 1, wherein the first receiver and the second receiver are a same common receiver, and wherein the second light band-reflect filter combines the second reflected beam and the second transmitted beam to form a mixed beam that is received by the common receiver.

12. An optical multiplexing device comprising at least one light-extraction module intercepting a light beam, each light-extraction module comprising a light band-reflect filter that receives the light beam, reflects a reflected beam of an extracted light wavelength band, and transmits the light beam except for the extracted light wavelength band; and a receiver that receives the reflected beam from the light band-reflect filter.

13. The optical multiplexing device of claim 12, wherein the optical multiplexing device comprises at least two of the light-extraction modules, each light-extraction module having a different extracted light wavelength band.

14. The optical multiplexing device of claim 12, wherein the light-extraction module further includes an alternate receiver, and a switch mirror that directs the reflected beam to the alternate receiver instead of the receiver.

15. The optical multiplexing device of claim 12, wherein the light band-reflect filter reflects the reflected beam of the light wavelength band, and transmits light of all other wavelengths.

16. The optical multiplexing device of claim 12, wherein the light band-reflect filter is an edge filter.

\* \* \* \* \*